United States Patent
Russell

[15] 3,668,372
[45] June 6, 1972

[54] TEMPERATURE SENSING DEVICE AND APPARATUS UTILIZING THE SAME

[72] Inventor: William H. Russell, Malvern, Pa.
[73] Assignee: Robertshaw Controls Company, Richmond, Va.
[22] Filed: Apr. 6, 1971
[21] Appl. No.: 131,672

[52] U.S. Cl. .................. 219/450, 73/368.4, 99/331, 219/516, 236/20 A, 236/57
[51] Int. Cl. ........................................................ H05b 3/68
[58] Field of Search ............ 219/449, 450, 516, 512, 513; 73/363, 368.4; 116/114.5; 99/DIG. 10, 331; 236/20 A, 57, 68

[56] References Cited

UNITED STATES PATENTS

| | | |
|---|---|---|
| 2,303,012 | 11/1942 | Weber et al. ............... 219/450 |
| 2,786,930 | 3/1957 | Weber et al. ............... 219/450 |
| 2,813,963 | 11/1957 | Lennox ........................ 219/449 |
| 2,872,555 | 2/1959 | Winslow ...................... 219/516 |
| 2,892,349 | 6/1959 | Wiberg et al. ............ 236/20 A X |
| 2,913,562 | 11/1959 | Weber et al. ............... 219/450 |
| 3,341,119 | 9/1967 | Tyler .......................... 236/57 |
| 3,367,572 | 2/1968 | Branson et al. ............. 236/68 |

Primary Examiner—Volodymyr Y. Mayewsky
Attorney—Candor, Candor & Tassone

[57] ABSTRACT

A temperature sensing device for sensing the temperature of a cooking vessel disposed on the heating means of a cooking apparatus comprising a bracket secured to the cooking apparatus and movably carrying a sensing element that contacts the bottom of the cooking vessel, the sensing element having a capillary tube interconnected thereto and having a single bend therein that provides the sole means for urging the sensing element into contact with the bottom of the cooking vessel.

20 Claims, 9 Drawing Figures

PATENTED JUN 6 1972 3,668,372

INVENTOR.
WILLIAM J. RUSSELL
BY
Carden, Carden & Tanner
HIS ATTORNEYS

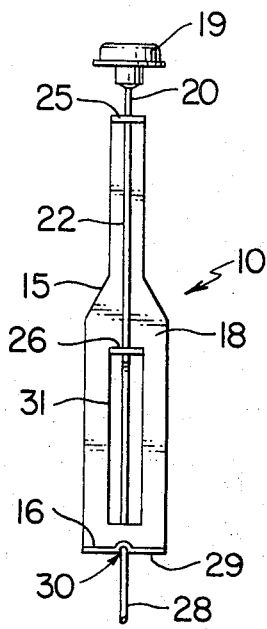
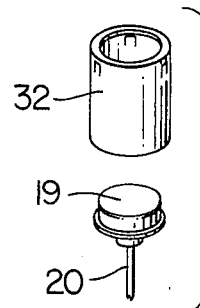
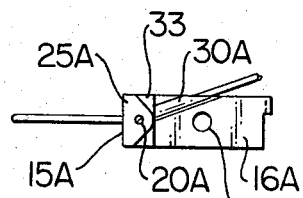
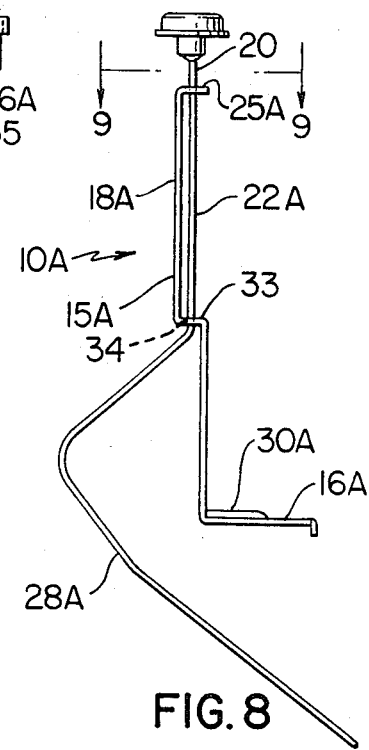
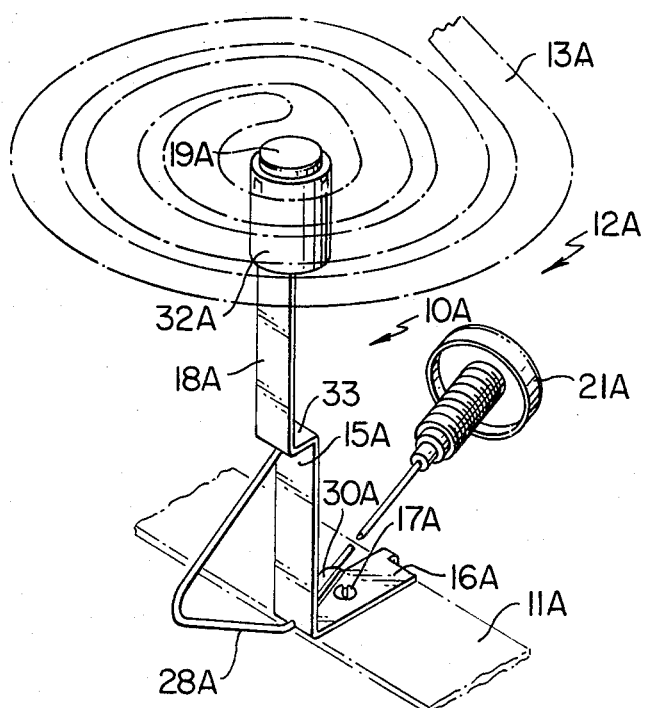
INVENTOR.
WILLIAM J. RUSSELL
BY
HIS ATTORNEYS

TEMPERATURE SENSING DEVICE AND APPARATUS UTILIZING THE SAME

This invention relates to an improved temperature sensing device for the heating element of a cooking apparatus or the like as well as to a cooking apparatus utilizing such a temperature sensing device.

It is well known that the control of a heating element for a cooking apparatus can be provided by sensing the temperature of the bottom of the cooking vessel being heated by such heating means so that the output temperature effect of the heating means will be controlled in relation to the temperature sensing condition at the bottom of the cooking vessel.

Normally, the temperature sensing element for such a heating element control is urged in a direction toward the cooking vessel by a spring arrangement so that good contact between the temperature sensing element and the bottom of the cooking vessel will be provided when the cooking vessel is set on the cooking apparatus to be heated by the heating means controlled by such sensing element.

One such arrangement is fully disclosed in the U.S. Pat. to Weber et al., No. 2,786,930, wherein the capillary tube leading from the temperature sensing element to the control device is itself formed in coiled fashion to provide a compression spring effect for urging the sensing element outwardly relative to the heating means so as to provide the spring force for contacting the sensing element against the bottom of the cooking vessel for the purpose previously described.

It is a feature of this invention to provide an improved temperature sensing device wherein the capillary tube of the sensing element provides the sole spring force for urging the temperature sensing element into contact with the bottom of the cooking vessel disposed on or adjacent the heating element of a cooking apparatus.

In particular, one embodiment of this invention provides a temperature sensing device having a bracket means adapted to be secured to the cooking apparatus for heating a cooking vessel. A temperature sensing element is movably carried by the bracket means and is adapted to contact the bottom of a cooking vessel. The temperature sensing element has a capillary tube interconnected thereto and leading therefrom to a conventional control device for the heating means of the cooking apparatus that is being utilized to heat the cooking vessel. The capillary tube has a first portion thereof movably carried by the bracket means to position the element relative to the bracket means. The capillary tube has a second portion thereof provided with a single bend between the first portion thereof and the bracket means to provide the sole spring force adapted to move the temperature sensing element relative to the bracket means in a direction to tend to contact the bottom of the cooking vessel.

Accordingly, it is an object of this invention to provide an improved temperature sensing device having one or more of the novel features set forth above or hereinafter shown or described.

Another object of this invention is to provide a cooking apparatus utilizing such a temperature sensing device.

Other objects, uses and advantages of this invention are apparent from a reading of this description, which proceeds with reference to the accompanying drawings forming a part thereof and wherein:

FIG. 5 is a side view of the structure illustrated in FIG. 3 and is taken substantially in the direction of the arrows 5—5 of FIG. 3.

FIG. 6 is a fragmentary, exploded, perspective view of the temperature sensing element and the shield therefor.

FIG. 7 is a view similar to FIG. 1 and illustrates another embodiment of the temperature sensing device of this invention.

FIG. 8 is a view similar to FIG. 3 and illustrates the temperature sensing device of FIG. 7 before the same is assembled to the cooking apparatus.

FIG. 9 is a fragmentary, cross-sectional view taken on line 9—9 of FIG. 8.

Figure 1:
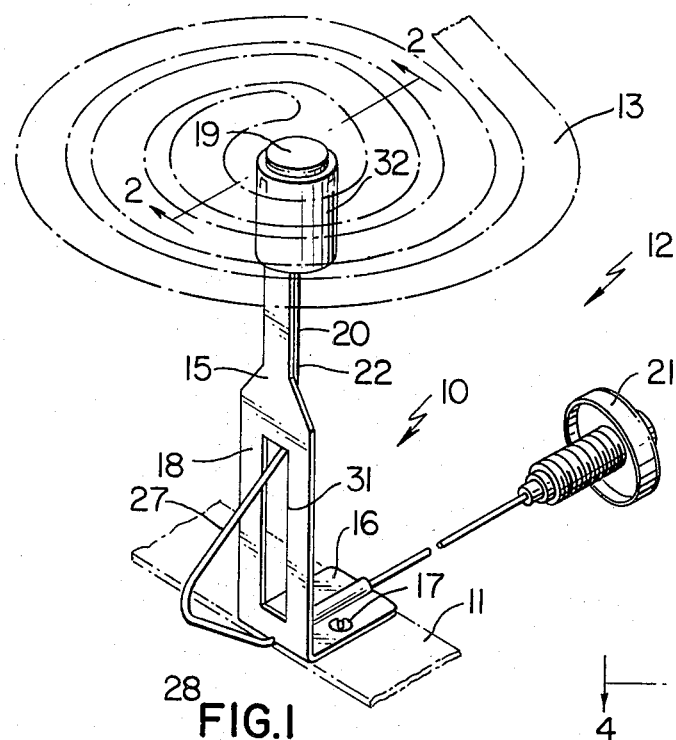
FIG. 1 is a fragmentary, perspective view illustrating one embodiment of the temperature sensing device of this invention mounted in a cooking apparatus.
Figure 4:
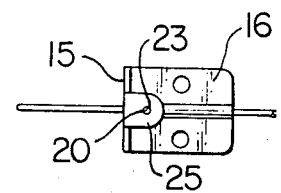
FIG. 4 is a cross-sectional view taken on line 4—4 of FIG. 3.

While the various features of this invention are hereinafter described and illustrated as being particularly adapted to provide a temperature sensing device for a heating means of a cooking apparatus, it is to be understood that the various features of this invention can be utilized singly or in any combination thereof to provide a temperature sensing device for other types of apparatus as desired.

Therefore, this invention is not to be limited to only the embodiments illustrated in the drawings, because the drawings are merely utilized to illustrate one of the wide variety of uses of this invention.

Figure 2:
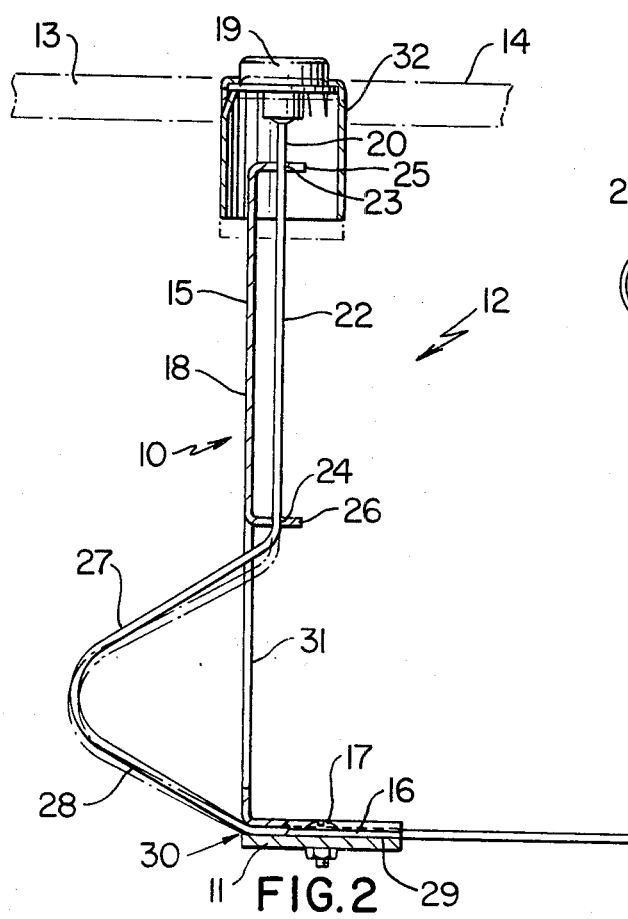
FIG. 2 is an enlarged, fragmentary, cross-sectional view taken on line 2—2 of FIG. 1 and illustrates in phantom lines the position of the temperature sensing element when a cooking vessel is disposed on the heating means of the cooking apparatus.
Figure 3:
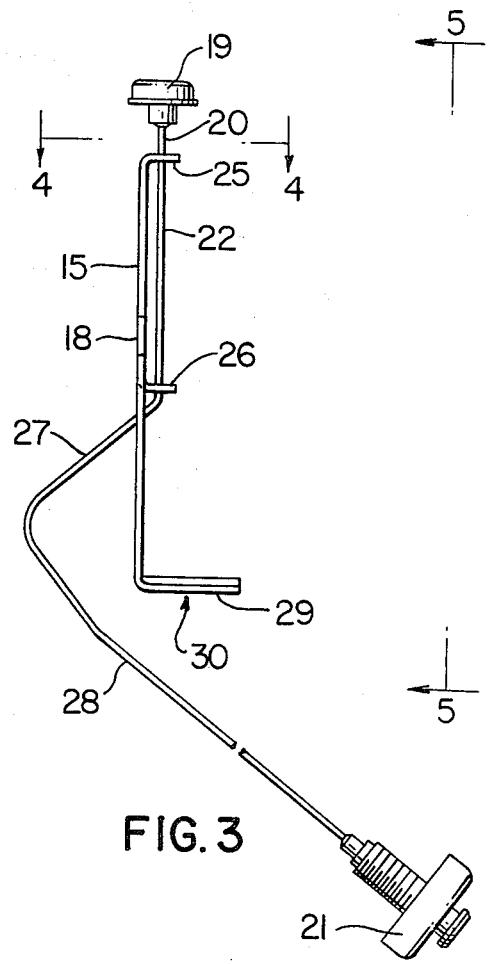
FIG. 3 is a reduced side view of the temperature sensing device of FIG. 2 before the same is assembled to the cooking apparatus.

Referring now to FIGS. 1, 2 and 3, one embodiment of the improved temperature sensing device of this invention is generally indicated by the reference numeral 10 and is illustrated as being mounted to a frame means 11 of a cooking apparatus, generally indicated by the reference numeral 12 in FIGS. 1 and 2, and having a suitable gas or electric heating means or element 13 adapted to receive a cooking vessel (not shown) on the top surface 14 thereof or adjacent thereto to be heated by the heating means 13.

The temperature sensing device 10 comprises a bracket means 15 having a mounting portion or foot 16 secured to the frame means 11 by suitable bolts 17 or other suitable fastening means to vertically support the body portion 18 of the bracket means 15 in the cooking apparatus 10 and position a temperature sensing element 19 of the control device 10 in the center of the heating means 13 to be contacted by the bottom wall of the cooking vessel when the same is disposed on the surface 14 of the heating means 13 or disposed adjacent thereto on suitable support means (not shown) in the conventional manner.

The temperature sensing element 19 has a capillary tube 20 extending therefrom and leading to an expandible and contractible element 21 adapted to form part of a conventional control device (not shown) which will control the temperature output effect of the heating means 13 in relation to the expansion and contraction of the power element 21 in a manner well known in the art. For example, the power element 21 can be of the type disclosed in the U.S. Pat. No. 3,367,572 and can be utilized to control an electrical switch for interconnecting and disconnecting an electrical power source to and from the heating element 13 in the same manner as provided in the aforementioned U.S. Pat. No. 2,786,930.

The capillary tube 20 for the temperature sensing element 19 has a straight portion 22 passing through suitable guide openings 23 and 24 provided respectively in outwardly directed, spaced and parallel tangs or ears 25 and 26 of the body portion 18 of the bracket means 15 so as to guide vertical up and down movement of the sensing element 19 between its outermost position as illustrated in full lines in FIG. 2 and its cooking vessel contacted position illustrated in phantom lines in FIG. 2.

In order to tend to maintain the temperature sensing element 19 in its upward vertical position as illustrated in full lines in FIG. 2 so that the temperature sensing element 19 is normally disposed above the surface 14 of the heating means 13 whereby the same will be positively contacted by the bottom wall of the cooking vessel when the cooking vessel is disposed on the surface 14 of the heating means 13, an intermediate portion 27 of the capillary tube 20 is provided with a single bend as illustrated in FIG. 2 with that bend being disposed in a vertical plane and normally tending to assume the configuration illustrated in FIG. 3 wherein a third portion 28 of the capillary tube 20 tends to be disposed remote from the foot or mounting portion 16 of the bracket means 15.

However, when the control device 10 is mounted to the cooking apparatus 10, the third portion 28 of the capillary tube 20 is brought between the foot 16 and the frame means 11 of the cooking apparatus 12 as illustrated in FIGS. 1 and 2 so as to be secured between the mounting portion 16 and the frame means 11 and thereby flex the portion 27 of the capillary tube 20 in such a manner that the same has a spring force tending to maintain the element 19 in the vertically up position as illustrated in full lines in FIG. 2.

In order to facilitate the mounting and securement of the third portion 28 of the capillary tube 20 between the foot 16 of the bracket means 15 and the frame means 11 of the cooking apparatus 12, the bottom surface 29 of the foot 16 is provided with an outwardly directed and open ended channel 30 which will receive the third portion 28 of the capillary tube 20 therein so as to permit the foot 16 to be firmly secured to the frame means 11 by the fastening means 17 without collapsing or otherwise adversely effecting the secured part 28 of the capillary tube 20.

In order to facilitate the bent part 27 of the capillary tube 20, the body portion 18 of the bracket means 15 has a longitudinal cutout 31 formed therein and through which the bent part 27 of the capillary tube 20 passes as illustrated in FIG. 1, the upper part of the cutout 31 defining the tang 26 whereas the upper end of the body part 18 is bent to define the cooperating tang 25 as illustrated.

In order to prevent cooking vessel spillage from clogging the guide openings 23 and 24 in the tangs 25 and 26 and thereby prevent up and down movement of the straight portion 20 of the capillary tube 20 for the purpose previously described, a suitable shield 32 can be carried by the temperature sensing element 19 by being press fitted thereon in the manner illustrated so as to protect the major portion of the bracket means 15 from cooking vessel spillage and the like.

Therefore, it can be seen that the temperature sensing device 10 of this invention can be formed in a relatively simple manner and from relatively few parts so that only a single bend in the capillary tube 20 of the temperature sensing device 19 provides the sole spring force for maintaining the temperature sensing element 19 in its up position as illustrated in FIG. 2 and thereby the force for maintaining the element 19 in contact with the bottom wall of the cooking vessel when the same is disposed on the surface 14 of the heating element 13 to move the element 19 downwardly in opposition to the force of the bend 27 as illustrated in phantom lines in FIG. 2.

Another embodiment of the temperature sensing device of this invention is generally indicated by the reference numeral 10A in FIGS. 7, 8 and 9 and is adapted to be utilized in the cooking apparatus 12A whereby parts of the cooking apparatus 12A and temperature sensing device 10A that are similar to like parts of the apparatus 12 and device 10 of FIGS. 1-6 are indicated by like reference numerals followed by the reference letter "A."

As illustrated in FIG. 7, the body portion 18A of the bracket means 15A for the device 10A is formed from a single ribbon of metallic material having its upper end bent over to form the upper guide tang 25A whereas an intermediate portion thereof is bent in a Z-shape to define an intermediate part 33 having an opening 34 therethrough for receiving the straight portion 22A of the capillary tube 20A in a manner similar to tang 26 previously described. The foot 16A of the bracket means 15A merely has a single opening 35 passing therethrough for receiving a single fastening member 17A for fastening the foot 16A to the frame means 11A whereby the channel means 30A for the foot 16A is disposed at an angle relative thereto as illustrated in FIGS. 7 and 9 to accommodate the third portion 28A of the capillary tube 20A for the purpose previously described.

Therefore, it can be seen that the temperature sensing device 10A functions in the same manner as the device previously described with the only variation being in the particular bracket means 15A being utilized as illustrated.

Therefore, it can be seen that this invention not only provides an improved temperature sensing device, but also this invention provides a cooking apparatus utilizing such an improved temperature sensing device.

While the form of the invention now preferred has been disclosed as required by the patent statute, other forms may be utilized, all coming within the scope of the following claims.

What is claimed is:

1. A temperature sensing device for sensing the temperature of a cooking vessel or the like comprising a bracket means adapted to be secured to a cooking apparatus for heating said cooking vessel, and a sensing element movably carried by said bracket means and being adapted to contact said cooking vessel, said sensing element having a capillary tube sealingly interconnected thereto and leading therefrom to a power element whereby said elements are sealingly and fluidly interconnected together by said capilary tube, said capillary tube having a first portion thereof movably carried by said bracket means to position said sensing element relative to said bracket means, said capillary tube having a second portion thereof provided with a single bend between said first portion thereof and said bracket means to provide the sole spring force adapted to move said sensing element relative to said bracket means in a direction to tend to contact said cooking vessel, said capilary tube having a third portion for being held stationary relative to said bracket means and being interconnected to said power element.

2. A device as set forth in claim 1 wherein said first portion of said capillary tube is disposed between said sensing element and said second portion of said tube.

3. A device as set forth in claim 1 wherein said first portion of said capillary tube is substantially straight.

4. A device as set forth in claim 3 wherein said bracket means has aligned openings passing therethrough, said straight portion of said capillary tube passing through said aligned openings to movably guide said sensing element relative to said bracket means.

5. A device as set forth in claim 1 wherein said bracket means has a mounting portion adapted to secure said bracket means to said cooking apparatus.

6. A device as set forth in claim 5 wherein said capillary tube is adapted to have said third portion thereof disposed between said mounting portion of said bracket means and said cooking apparatus to secure said third portion of said tube from movement relative to said apparatus.

7. A device as set forth in claim 6 wherein said second portion of said tube is disposed intermediate said first and third portions thereof.

8. A device as set forth in claim 6 wherein said mounting portion of said bracket means has an open ended channel for receiving said third portion of said tube.

9. A device as set forth in claim 6 wherein said mounting portion of said bracket means comprises a foot of said bracket means that is disposed substantially at a right angle relative to the remainder of said bracket means.

10. A device as set forth in claim 9 wherein said foot is adapted to be secured to a horizontal part of said cooking apparatus to vertically mount said remainder of said bracket means, said single bend of said capillary tube being disposed within a vertical plane to vertically urge said sensing element relative to said bracket means.

11. In a cooking apparatus having a heating means for heating a cooking vessel, the improvement comprising a temperature sensing device for sensing the temperature of said cooking vessel, said device having a bracket means secured to said cooking apparatus, and a sensing element movably carried by said bracket means and being adapted to contact said cooking vessel, said sensing element having a capillary tube sealingly interconnected thereto and leading therefrom to a power element whereby said elements are sealingly and fluidly interconnected together by said capillary tube, said capillary tube having a first portion thereof movably carried by said bracket means to position said sensing element relative to said bracket means, said capillary tube having a second portion thereof provided with a single bend between said first portion thereof and said bracket means to provide the sole spring force to tend to move said sensing element relative to said bracket means in a direction to tend to contact said cooking vessel, said capillary tube having a third portion held stationary relative to said bracket means and being interconnected to said power element.

12. In a cooking apparatus as set forth in claim 11, the further improvement wherein said first portion of said capillary tube is disposed between said sensing element and said second portion of said tube.

13. In a cooking apparatus as set forth in claim 11, the further improvement wherein said first portion of said capillary tube is substantially straight.

14. In a cooking apparatus as set forth in claim 13, the further improvement wherein said bracket means has aligned openings passing therethrough, said straight portion of said capillary tube passing through said aligned openings to movably guide said sensing element relative to said bracket means.

15. In a cooking apparatus as set forth in claim 11, the further improvement wherein said bracket means has a mounting portion secured to said cooking apparatus.

16. In a cooking apparatus as set forth in claim 15, the further improvement wherein said capillary tube has said third portion thereof disposed between said mounting portion of said bracket means and said cooking apparatus whereby said third portion of said tube is secured from movement relative to said apparatus.

17. In a cooking apparatus as set forth in claim 16, the further improvement wherein said second portion of said tube is disposed intermediate said first and third portions thereof.

18. In a cooking apparatus as set forth in claim 16, the further improvement wherein said mounting portion of said bracket means has an open ended channel receiving said third portion of said tube.

19. In a cooking apparatus as set forth in claim 16, the further improvement wherein said mounting portion of said bracket means comprises a foot of said bracket means that is disposed substantially at a right angle relative to the remainder of said bracket means.

20. In a cooking apparatus as set forth in claim 19, the further improvement wherein said foot is secured to a horizontal part of said cooking apparatus to vertically mount said remainder of said bracket means, said single bend of said capillary tube being disposed within a vertical plane to vertically urge said sensing element relative to said bracket means.

* * * * *